United States Patent Office 3,285,967
Patented Nov. 15, 1966

3,285,967
CATALYTIC DEALKOXYLATION OF GEM-DI-ALKOXY COMPOUNDS
William D. Schaeffer, Pomona, Calif., assignor to Union Oil Company of California, Los Angeles, Calif., a corporation of California
No Drawing. Filed Oct. 21, 1963, Ser. No. 317,808
10 Claims. (Cl. 260—614)

This invention relates to the conversion of gem-dialkoxy compounds to unsaturated ethers and in particular relates to the catalysis of such conversion.

This invention comprises the use of a trilithium orthophosphate catalyst and, preferably an alkaline trilithium orthophosphate catalyst on a silicious support for said conversion.

It is known that vinyl ethers can be produced by the vapor phase thermal or catalytic dissociation of gem-dialkoxy compounds. Various catalysts have been proposed for this use including sodium and magnesium acid phosphate salts alone or deposited on a carbon or sodium silicate carrier; see Nazarov et al., "Journal of General Chemistry of the U.S.S.R.," 29, pp. 116–122 (1959).

I have now found that high yields of unsaturated ethers can readily be obtained from acetals by use of an alkaline trilithium orthophosphate catalyst. The trilithium orthophosphate catalyst does not behave in a manner similar to the aforementioned sodium and magnesium acid phosphate catalysts disclosed in the art but rather has its own unique characteristics.

The catalyst comprises as the active ingredients, trilithium orthophosphate and, preferably, basic trilithium orthophosphate that has been prepared in accordance with the conditions and procedure hereafter set forth. Preferably, the trilithium orthophosphate catalyst is distended on a silica support such as silica gel, diatomaceous earth, bonded silica, quartz, etc. Naturally occurring lithium orthophosphate, i.e., lithiophilite and samples of trilithium orthophosphate prepared by neutralization of 3 mols of lithium hydroxide per mol of phosphoric acid or by the reaction or soluble lithium salts such as lithium nitrate, lithium sulfate, lithium chloride and sodium orthophosphate in acid or alkaline solutions can also be used. Preferably, however, basic lithium phosphate is employed.

The basic lithium phosphate is precipitated in the presence of an excess of at least 0.2 mol, preferably 1 to 2 mols of an alkali metal hydroxide per mol of lithium phosphate. The alkali metal hydroxide, for example, lithium hydroxide, sodium hydroxide, cesium hydroxide, potassium hydroxide or mixtures thereof may be present in the lithium salt solution, in the phosphate solution, or both, its presence in solution being desired prior to formation of the precipitated lithium phosphate. The phosphate solution can, preferably, be an aqueous solution or orthophosphoric acid. Solutions of sodium or potassium orthophosphates or mixtures thereof can also be used, if desired. The lithium solution can be an aqueous solution of lithium hydroxide (when orthophosphoric acid is used as a source of phosphate) or a soluble lithium salt can be used in base exchange with the sodium or potassium of the aforementioned phosphate salt solutions such as lithium nitrate, lithium acetate, lithium formate, lithium borate, lithium halides such as lithium chloride, lithium sulfate, etc.

The solutions are admixed in the requisite quantities to obtain a slurry of insoluble trilithium orthophosphate. Generally, sufficient quantities of lithium hydroxide and/or the aforementioned alkali metal hydroxides are employed to completely neutralize the acid, i.e. corresponding to three equivalent weights of base per mol weight of orthophosphoric acid. Preferably, the amount of alkali metal hydroxide used is slightly in excess of the aforementioned stoichiometric amount. Under these conditions, the trilithium orthophosphate is formed and precipitates as a slurry from which the desired trilithium phosphate salt can be recovered by conventional solid liquid separation techniques such as filtration, centrifugation, etc. The separated salt is thereafter leached with water to remove a portion of its alkali hydroxide content. This can be readily achieved by mixing the solid with several volumes of water, followed by filtration from 1 to about 5 times. Preferably, for optimum activity, 3 to 5 leachings are employed, resulting in a trilithium orthophosphate solid having an alkali hydroxide content ranging from 0.05 to 1.0 percent by weight.

As previously mentioned, the preferred catalyst comprises the aforementioned trilithium orthophosphate catalyst distended on a carrier such as silica gel, diatomaceous earth, silica, quartz, etc. Preferably, the silica has a specific surface from about 2 to 1000 square meters per gram and most preferably silicas having from about 300 to 850 square meters per gram are used. The catalyst can be distended on the carrier in any conventional technique, e.g., by precipitating said trilithium orthophosphate in the presence of a slurry of the silica or by admixing the trilithium orthophosphate precipitate with the silica. After the materials are thoroughly admixed the final catalyst is prepared by pelletizing or extruding the mixture into particles of the desired shape followed by drying at temperatures between about 200° and about 500° F. for about 0.5 to 10 hours. If desired, the solids can be calcined by heating the dried catalyst particles to temperatures between about 500° and about 1000° F. for about 0.5 to 10 hours.

The size of the catalyst particles will depend on the type of solid-vapor contacting employed. Preferably, the catalyst is employed as a fixed bed and the vapors and gases are passed therethrough. In such contacting, catalyst particles from about ½ inch; preferably from about ¼ inch; to about 0.16 inch average diameter, i.e., retained on a 35 mesh screen, are employed. When fluidized contacting is employed where the catalyst particles are suspended in a stream of the vapors to be contacted, catalyst particles passing about a 40 mesh screen and retained on about a 500 mesh screen can be employed. Preferably, particles from about 100 to 400 mesh are employed in this type of contacting.

The reactants to be converted in my reaction in general can be gem-alkoxy compounds corresponding to the general structural formula of:

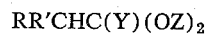

RR'CHC(Y)(OZ)$_2$ wherein Y, R and R' are hydrogen, aryl or alkyl groups having from about 1 to about 7 carbons;
Z is an alkyl group having from about 1 to about 7 carbons; and
the total carbons in said gem-dialkoxy compound are from 4 to about 20.

Preferably, gem-dialkoxy alkanes wherein the alkane group has from 2 to about 4 carbons, i.e., gem-dialkoxy derivatives of acetaldehyde, propionaldehyde, acetone and butyraldehyde, are used and, most preferably, also where the alkoxy groups have from 1 to about 5 carbons.

Specific examples of reactants that can be employed are the dimethyl, diethyl diisopropyl, dibutyl, diamyl, acetals of such aldehydes as acetaldehyde, propionaldehyde, butyraldehyde, isobutyraldehyde, valeraldehyde, hexaldehyde, octaldehyde, α-tolualdehyde, as well as of such ketones such as acetone, methylethyl ketone, diethyl ketone, dipropyl ketone, diisobutyl ketone, di-n-octyl ketone, benzyl methyl ketone, etc.

If desired, gem-dialkoxy compounds wherein the alkoxy groups comprise a cyclic moiety can also be cracked with my catalyst. Examples of such are 2-methyl 1,3-dioxan; 2-ethyl 1,3-dioxan; 2-isopropyl 1,3-dioxan; 2-benzyl 1,3-dioxan; 2-diphenyl-methyl 1,3-dioxolane; 2-butyl 1,3-dioxan; 2-ethyl 1,3-dioxolane; 2-isopropyl 1,3-dioxolane; 2-isobutyl 1,3-dioxolane; 2,2-dimethyl 1,3-dioxolane; etc.; these reactants being readily obtained by the reaction of the corresponding glycol, e.g., ethylene glycol for dioxolanes and 1,3-propylene glycol for dioxanes, with the corresponding carbonyl compound such as acetaldehyde, propionaldehyde, acetone, etc. Alternatively, these same dioxanes or dioxolanes may be prepared by reaction of the glycol with the appropriate olefine, e.g., ethylene, propylene, 1-butene, etc., in the presence of a Group VIII metal compound under acidic conditions.

Upon cracking with my catalyst, the resultant unsaturated ethers that can be obtained by the process from the aforementioned alkyl dioxanes and dioxalanes are as follows: 2-methyl 1,3-dioxolane yields diethylene glycol monovinyl ether; 2-methyl 1,3-dioxan yields 1,3-propylene glycol monovinyl ether; 2-ethyl 1,3-dioxan yields 1,3-propylene glycol monopropenyl ether; etc.

Alkyl alkylene ethers that can be obtained from the gem-dialkoxy alkanes are exemplified by the following: methyl vinyl ether, ethyl propenyl ether, isopropyl vinyl ether, butyl vinyl ether, amyl vinyl ether, amyl isopropenyl ether, methyl 1-butenyl ether, ethyl 1-hexenyl ether, amyl 1-hexenyl ether, ethyl 4-hep-3-enyl ether, methyl 1-octenyl ether, amyl 3-octenyl ether, etc.

The reaction is conducted under vapor phase conditions at temperatures ranging from about 150° to about 450° C., preferably from about 250° to 350° C. Preferably, atmospheric pressures are employed; however, if desired, subatmospheric and superatmospheric pressures can be employed from about 0.01 to about 50 atomspheres. The subatmospheric pressures are preferred when the gem-dialkoxy compounds is not readily vaporized at reaction temperatures and atmospheric pressures. In these instances, it is preferred to employ the aforementioned subatmospheric pressures ranging from atmospheric to about 0.1 atmosphere.

The reaction is simply conducted by passing the gem-dialkoxy compound through a heated column or bed of the catalyst. Prior to contacting the catalyst, the gem-dialkoxy compound can be preheated to the reaction temperature, or, if desired, all or a portion of the necessary preheat can be supplied by preheating the catalyst. If desired, the catalyst—particularly in fluidized contacting—can be preheated prior to contact with the gem-dialkoxy compound and the preheated catalyst solid thereafter fluidized or suspended by vapors of the gem-dialkoxy compounds.

The vaporized compounds can be directly contacted with the catalyst or can be admixed with a volatile inert gaseous or vapor diluent such as nitrogen, carbon dioxide, aliphatic alcohols, ethers or hydrocarbons such as methane, ethane, propane, butane, benzene, toluene, hexane, etc. In a particular embodiment, the conversion to an unsaturated ether is combined with the preparation of the gem-dialkoxy compound by oxidation of an olefin in an alcoholic solution. The resultant dialkoxy product from this process frequently forms azeotropes with the alcohol reaction medium, e.g., 1,1-dimethoxy ethane forms an azeotrope with methanol that contains approximately 25 volume percent of methanol. The vapors of the azeotrope can be heated to the aforementioned temperatures and thereafter subjected to contact with the catalyst for the preparation of the unsaturated ether product.

The decomposition of the gem-dialkoxy compound to the unsaturated ether and corresponding alcohol proceeds rapidly under the aformentioned temperature and pressure conditions. In general, liquid hourly space velocities that can be employed range from about 0.1 to about 5 and most preferably, from about 0.5 to about 2.0. After contacting the catalyst, the crude reaction product is condensed and thereafter fractionated to recover the volatile unsaturated ether as the product of the reaction. The unsaturated glycol ethers obtained from the aforementioned cracking of various alkyl dioxanes and dioxolanes can be purified by fractionation and volatilization of any diluent used during cracking and/or volatile by-products obtained. The liquid residue from the distillation of the acetal or ketal cracking comprises the alcohol formed during the decomposition of the acetal or ketal together with any condensed diluent employed during the reaction period.

The following examples will illustrate the preparation and use of the catalyst of my invention and demonstrate the results obtainable therewith:

*Example 1*

An alkaline trilithium orthophosphate catalyst was prepared by the addition of 33.6 grams of lithium hydroxide monohydrate to 120 grams of water together with 23.0 grams of 85 percent orthophosphoric acid. A precipitate of trilithium orthophosphate was formed and the resultant slurry was thereafter added to 200 grams of silica pellets having an average particle diameter of 3/16 inch. The mixture was thoroughly stirred, filtered and the solid obtained was then dried at 150° C. and thereafter leached 3 times with 300 milliliter portions of hot water. The catalyst was finally dried at 150° C.

*Example 2*

Alkaline catalysts of trisodium orthophosphate and trimagnesium orthophosphate were prepared in a similar manner by neutralization of 85 percent orthophosphoric acid with a molar excess of the metal hydroxide in water.

Another catalyst was prepared by adding magnesium carbonate to 85 percent orthophosphoric acid in sufficient quantities to prepare magnesium hydrogen orthophosphate. The resultant slurry was thereafter poured over the aforementioned silica particles, dried, washed with 3 volumes of water and finally dried at 150° C. A second portion of the magnesium hydrogen phosphate slurry was also poured over finely divided carbon particles, the solids were separated, dried, and washed with water and finally dried at 150° C. to obtain a magnesium hydrogen phosphate on carbon catalyst.

Catalysts on sodium silicate supports were prepared with magnesium hydrogen phosphate and trilithium phosphate as the active components. These catalysts were formed by adding the aqeuous slurry of magnesium hydrogen orthophosphate or trilithium orthophosphate to a water glass solution and allowing the resultant gel to dry sufficiently for extrusion through an 8 mesh screen. The catalyst particles so prepared were dried in an oven for two hours and then calcined at 350° for two hours.

*Example 3*

The aforementioned catalysts were tested for their activity in the decomposition of 1,1-diethoxy ethane by packing a reaction tube with the particular catalyst, inserting the tube in a globar furnace and pre-heating the catalyst to the desired temperature. A mixture of the acetal and corresponding alcohol, ethanol, was permitted to drip into the reaction to attain a predetermined rate for the desired liquid hourly space velocity. The vapors of the reaction mixture were carried through the tube by a slow stream of nitrogen and collected at the bottom of the tube by condensation in an acetone-Dry Ice trap. The following table summarizes the reaction conditions employed and the results obtained when using the catalyst of my invention and related catalysts.

TABLE 1.—CATALYSIS OF ACETAL CRACKING

| Test No. | Catalyst | Conditions | | Product Distribution, wt. percent | | | | Conversion of Acetal, mol percent | Selectivity to EVE,[2] mol percent | Selectivity to AcH,[4] mol percent |
|---|---|---|---|---|---|---|---|---|---|---|
| | | Temp., °C. | LHSV[1] | EVE[2] | Acetal | EtOH[3] | AcH[4] | | | |
| 1 | $Li_3PO_4$ on $SiO_2$ | 250 | 0.72 | 5.80 | 23.45 | 70.11 | 0.48 | 37 | 69 | 9.2 |
| 2 | $Li_3PO_4$ on $SiO_2$ | 300 | 0.72 | 10.85 | 14.75 | 73.75 | 0.51 | 60 | 81 | 6.2 |
| 3 | $Li_3PO_4$ on $SiO_2$, fresh sample | 300 | 1.2 | 10.68 | 28.70 | 59.94 | | 39 | 94.5 | |
| 4 | $Li_3PO_4$ on $SiO_2$, fresh sample | 300 | 0.6 | 20.70 | 11.81 | 65.97 | | 75 | 95.9 | |
| 5 | $Li_3PO_4$ on $SiO_2$, fresh sample | 300 | 0.3 | 15.20 | 5.81 | 78.44 | | 85 | 77 | |
| 6 | $Li_3PO_4$ on $SiO_2$, fresh sample | 350 | 0.55 | 33.44 | 30.29 | 32.36 | 2.75 | 70.8 | 76.8 | 10.0 |
| 7 | $K_3PO_4$ on $SiO_2$ | 350 | 0.72 | | 30.57 | 68.73 | 0.59 | 22 | | 18 |
| 8 | $Na_3PO_4$ on $SiO_2$ | 350 | 0.72 | | 32.02 | 67.38 | 0.48 | 14 | | 25 |
| 9 | $Ca_3(PO_4)_2$ on $SiO_2$ | 350 | 0.72 | 15.95 | 4.77 | 78.27 | 0.93 | 87.6 | 77.5 | 7.4 |
| 10 | $Ba_3(PO_4)_2$ on $SiO_2$ | 350 | 0.72 | 0.48 | 29.57 | 68.42 | 1.03 | 20 | 11 | 37 |
| 11 | $Sr_3(PO_4)_2$ on $SiO_2$ | 350 | 0.72 | 6.99 | 17.38 | 74.87 | 0.66 | 51 | 64 | 9.9 |
| 12 | $Mg_3(PO_4)_2$ on $SiO_2$ | 350 | 0.72 | 11.87 | 6.25 | 80.76 | 0.74 | 84 | 61 | 6.2 |
| 13 | $NaH_2PO_4$ on silica gel | 300 | 1.2 | 0.3 | 30.8 | 67.8 | 0.4 | 24 | 5.3 | 3.7 |
| 14 | $MgHPO_4$ on carbon | 300 | 1.2 | | 19.5 | 79.4 | 0.2 | 46 | | |
| 15 | $MgHPO_4$ on $Na_2SiO_3$ | 300 | 1.2 | 8.2 | 17.6 | 73.1 | 0.1 | 49 | 80 | |
| 16 | $MgHPO_4$ on $Na_2SiO_3$ | 350 | 0.72 | 13.4 | 6.9 | 78.7 | 0.6 | 80 | 96 | |
| 17 | $MgHPO_4$ on $SiO_2$ | 300 | 1.2 | | 31.2 | 68.0 | 0.3 | | | |
| 18 | $Li_3PO_4$ on $Na_2SiO_3$ | 300 | 1.2 | | 33.1 | 66.2 | 0.3 | | | |
| 19 | $Li_3PO_4$ on $Na_2SiO_3$ | 300 | 1.2 | 0.07 | 33.09 | 66.17 | 0.29 | Negl. | Negl. | |

[1] Liquid hourly space velocity, i.e., liquid volume per catalyst volume per hour. [2] Ethylvinyl ether. [3] Ethanol. [4] Acetaldehyde.

The preceding results demonstrate that the trilithium orthophosphate catalyst has a high activity and selectivity for the conversion of an acetal to an unsaturated ether. In particular, the preceding results demonstrate that the trilithium orthophosphate catalyst is not similar in its behavior to that of various prior art suggested catalysts. To illustrate, the use of sodium silicate carrier for the trilithium orthophosphate catalyst results in almost complete inhibition of the catalytic activity of the material. In contrast, the use of a silica carrier for the trilithium orthophosphate catalyst results in enhancement of the activity of the material. The prior art suggested catalyst comprising magnesium hydrogen orthophosphate on sodium silicate shows a corresponding high activity for acetal cracking. However, preparation of this catalyst on a silica support rather than sodium silicate again completely inhibits the catalytic activity of this material. The examples also demonstrate that lithium was unique in the alkali metals and alkaline earths for its activity in the reaction.

When an unsupported trilithium orthophosphate catalyst was used in lieu of the silica supported catalyst of Tests 1 through 6, comparable results are obtained. The trilithium orthophosphate catalyst shows a similar high level of activity and selectivity for the dealkoxylation of 1,1-dimethoxy ethane, 1,1-dimethoxy propane and for the decyclization of 2-methyl 1,3-dioxan.

The preceding examples have been presented to illustrate the practice of my invention and to demonstrate the results obtainable therefrom. The examples are not intended to unduly limit or restrict the invention that is defined by the steps and their obvious equivalents set forth in the following claims.

I claim:

1. The process for cracking a gem-dialkoxy compound selected from the class consisting of acyclic gem-dialkoxy compounds corresponding to the following:

$$RR'CHC(Y)(OZ)_2$$

and cyclic gem-dialkoxy compounds corresponding to the following:

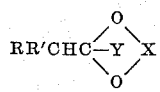

wherein:
R, R' and Y are hydrogen, aryl or alkyl groups having from 1 to about 7 carbons;
Z is an alkyl group having from 1 to about 7 carbons;
X is an alkylene group having 2 to 3 carbons; and the total carbons in said gem-dialkoxy compound are from 4 to about 20;

said process comprising contacting said gem-dialkoxy compound with trilithium orthophosphate at a temperature between about 150° and 450° centigrade and to crack said gem-dialkoxy compound to an unsaturated ether recovering therefrom said unsaturated ether.

2. The method of claim 1 wherein said gem-dialkoxy compound is an acyclic gem-dialkoxy alkane.

3. The method of claim 1 wherein said trilithium orthophosphate has an alkali hydroxide content ranging from 0.05 to 1.0 percent by weight.

4. The method of claim 1 wherein said trilithium orthophosphate catalyst is distended on a silica carrier.

5. The method for the preparation of vinyl ethers from gem-dialkoxy ethanes corresponding to the structural formula of:

$$CH_2CH(OZ)_2$$

wherein:
Z is hydrogen or an alkyl group having from 1 to about 5 carbons;
the said method comprising contacting said alkoxy ethane with a solid comprising trilithium orthophosphate at a temperature from about 150° to about 450° centigrade.

6. The method of claim 5 wherein said temperature is from about 250° to 350° centigrade.

7. The method of claim 5 wherein said solid also comprises an alkali metal hydroxide content from 0.05 to 1.0 percent by weight.

8. The method of claim 5 wherein said trilithium orthophosphate is distended on a silica carrier.

9. The method of claim 5 wherein said alkoxy ethane is diethoxy ethane and said vinyl ether is ethyl vinyl ether.

10. The method of claim 5 wherein said alkoxy alkane is dimethoxy ethane and said vinyl ether is methyl vinyl ether.

References Cited by the Examiner

UNITED STATES PATENTS 1,931,858 10/1933 Baur _____ 260—614
2,479,068 8/1949 Gresham _____ 260—615

FOREIGN PATENTS 1,253,965 1/1961 France.
(Aguadisch, corresponding U.S. Patent 3,218,359, 11/1965.)
515,101 7/1955 Canada.
532,069 10/1956 Canada.

OTHER REFERENCES

Nazarov et al.: "Zhurnal Obschei Khimii," vol. 29 (1959), pages 111–117.

LEON ZITVER, *Primary Examiner.*

H. T. MARS, *Assistant Examiner.*